A. BIXBY.
Carriage Clip.
No. 95,761.
Patented Oct. 12, 1869.
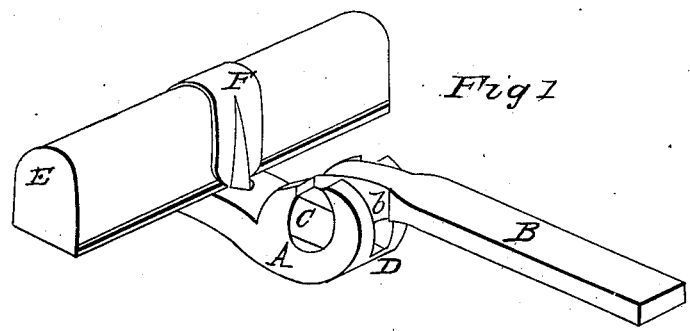
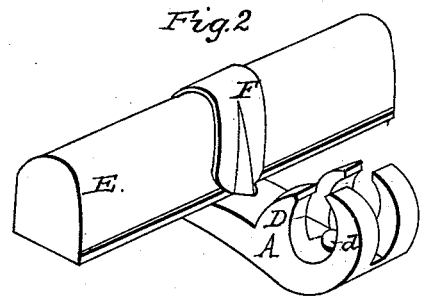
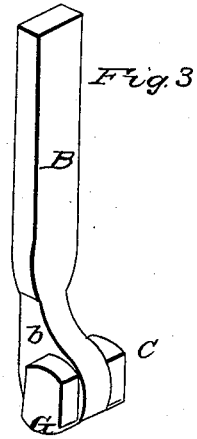
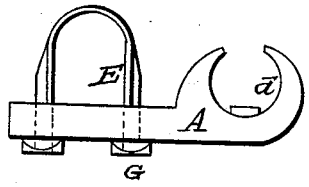
Witnesses
Ralph Smith
Joseph A. Morse
Inventor
Alfred Bixby
by A. G. Boynton
his atty in fact

UNITED STATES PATENT OFFICE.

ALFRED BIXBY, OF LANSING, MICHIGAN.

IMPROVEMENT IN CARRIAGE-CLIPS.

Specification forming part of Letters Patent No. 95,761, dated October 12, 1869.

*To all whom it may concern:*

Be it known that I, ALFRED BIXBY, of Lansing, Ingham county, State of Michigan, have invented a new and useful Improvement in Carriage-Clips; and I do hereby declare that the following is a full, clear, and precise description thereof, which will enable others skilled in the art to make and use the same, reference being had to the accompanying drawing, forming part of this specification, in which—

Figure 1 is a perspective view of so much of a carriage with the clip attached as is necessary to show the same; Fig. 2, a perspective view of the clip with the shaft-iron detached; Fig. 3, a perspective, and Fig. 4 a top, view of the shaft-iron; Fig. 5, a side view of the clip, and Fig. 6 a side view of the shaft-iron.

Similar letters of reference indicate like parts.

My invention relates to carriage-clips of the class hereinafter described; and consists in providing the bottom of these clips with a rubber pad arranged so as to press vertically against the shank of the shaft-iron, and thus hold its projections or arms in place, and also prevent rattling.

A represents an iron box or clip attached to the axle E of a carriage. B represents a shaft-iron, with a shank, $b$, fitted to the longitudinal slot D in the clip A.

C C are projections on each side of the shaft-iron, of a size to fit the bolt-hole in the clip, and cut plane at the top and bottom, so that when the shaft-iron is held vertically the projections C C will pass through the opening at the top of the clip into the cylindrical bolt-hole in A.

$d$ is a rubber pad attached to the clip at the bottom of the slot D, which holds the projections C C in place by pressure upon the shank $b$ of the shaft-iron B.

In order to facilitate the entering of the thill-iron into the hook or eye of the part A, the under rounded portion of the iron $b$ should be made a little eccentric at the point where it bears upon the rubber, so that it may be readily entered far enough to have the cross-head C engage with the hook without pressing much on the rubber, and then as the thills are turned down to a horizontal position the eccentric portion will press tightly upon the rubber, and thus prevent rattling.

The clip is operated by holding the shaft-iron B in a vertical position, inserting it in the clip, and then turning it forward into position, where it is securely held by the rubber pad $d$.

I am aware that rubber has heretofore been used in various forms to prevent rattling, and also that couplings have been made in which the thill-irons were inserted from above, and locked by turning the thills down, and therefore I claim neither of these, separately considered; but What I do claim is—

A thill-coupling consisting of the iron $b$, with the cross-head or lugs C, and the hook A, having the rubber $a$ inserted in the bottom thereof, as shown and described.

ALFRED BIXBY.

Witnesses:
 EDMUND PARMELEE,
 T. B. BOWMAN.